3,591,533
PROCESS FOR THE PRODUCTION OF
POLYAMIDE FOAMS
Hermann Schnell, Krefeld-Uerdingen, and Heinrich Gilch, Uerdingen, Germany, assignors to Farbenfabriken Bayer Aktiengesellschaft, Leverkusen, Germany
No Drawing. Filed July 19, 1967, Ser. No. 654,382
Int. Cl. C08f 47/08; C08j 1/14
U.S. Cl. 260—2.5    8 Claims

ABSTRACT OF THE DISCLOSURE

The invention relates to the production of polyamide foams from the polymerization of lactams in the presence of an organic isocyanate and a metal borohydride.

---

This invention relates to a process for the production of polyamide foams in which foaming is carried out during the polymerisation of lactams, said process being carried out by heating a lactam or a mixture of lactams with an isocyanate or a masked isocyanate in the presence of an alkali-metal or alkaline-earth metal borohydride. Colourless polyamide foams are obtained.

It is known that polyamide foams can be produced by mixing polyamide melts with substances which evaporate in the polyamide melt or which give off gaseous products. Unfortunately, processes such as these are difficult to work on an industrial scale and generally yield non-uniform foams of high density.

It is also known that polyamide foams can be produced by blowing in inert gases, for example nitrogen during the rapidly proceeding, ionic polymerisation reaction carried out in the presence of bases and co-catalysts, or by carrying out the polymerisation reaction in the presence of products which give off gases for example azides, or readily volatile substances. The blowing-in of inert gases is a difficult technique to handle on an industrial scale, involving complicated apparatus. Complicated mouldings can only with great difficulty be produced in this way. If polymerisation is carried out in the presence of products which give off gases, such as azides, the evolution of gas must begin at exactly the same time as polymerisation. Any slight delays in the reaction, or variations in the induction period, result in varying densities or prevent foaming altogether. In addition, the handling of azides involves hazards which should never be underestimated. In cases where foaming is carried out during the ionic polymerisation of lactams by the addition of relatively low boiling materials, such as volatile solvents, it is usually only possible to employ the "two-pot" process. As soon as polymerisation begins a readily volatile substance or solution thereof is stirred into the lactam. The use of the "one-pot" process has the disadvantages referred to above, i.e. the experiments are difficult to reproduce on an industrial scale. Any foaming which is based on the ionic polymerisation reaction must be carried out in the strict absence of water, whilst the lactams themselves have to be dried with particular care before polymerisation, which involves complications and takes time when carried out on a large scale.

In general, it is difficult, as far as industrial processes are concerned, completely to eliminate the oxygen from the atmosphere. As a result, the foams produced by all the processes referred to above are readily discoloured through the effects of oxidation.

It has now been found that colourless polyamide foams can be produced by a process which comprises heating a lactam or a mixture of lactams having at least seven ring members with an isocyanate or a masked isocyanate at temperatures in the range from 100 to 260° C. in the presence of an alkali-metal or alkaline-earth metal borohydride. In this process, a carbodiimide which also acts as a co-catalyst in the polymerisation of the lactams, is formed from the isocyanate, accompanied by the evolution of carbon dioxide. Under the reaction conditions, the alkali-metal or alkaline-earth metal borohydride added as polymerisation catalyst, catalyses the conversion of isocyanate into carbodiimide and carbon dioxide. Accordingly, it is possible by virtue of the process according to the invention to produce polyamide foams at temperatures only slightly higher than the melting point of the corresponding lactams. In contrast to the conventional, ionic polymerisation process used to prepare bubble-free polyamide, where even traces of water are sufficient to inhibit polymerisation it was found that foaming can be carried out by the process according to the invention even when the lactam has a water content of 0.2%. The density of the foams is governed both by the temperature and by the content of isocyanate or masked isocyanate. Under industrial conditions, colourless polyamides are obtained very easily by virtue of the reducing effect.

Lactams containing at least seven ring members, such as caprolactam, capryl lactam and lauric lactam, are used either individually or in admixture with one another in the process according to the invention. Industrial products can be used without further purification or drying. Alkali-metal or alkaline-earth metal borohydrides, for example sodium borohydride or calcium borohydride, are used as the catalysts. Industrial products can be used without further purification, preferably in finely powdered form. The catalyst is used in quantities of 0.01 mol. percent to 2 mol. percent, preferably in quantities of 0.05 mol. percent to 1.0 mol. percent, based on the lactam used.

Suitable co-catalysts and expanding agents are alkyl or aryl mono- or polyisocyanates, such as stearyl isocyanate, phenyl isocyanate, hexamethylene diisocyanate, phenylene diisocyanate and 4,4'-diphenylmethane diisocyanate. So-called masked isocyanates which form isocyanates on heating, such as hexamethylene-1,6-bis-carbamidocaprolactam, have a similar effect. Polyisocyanates, or compounds which form polyisocyanates, are particularly suitable for foaming. Polyisocyanates produce a particularly steep rise in the viscosity/time curve during foaming. Fairly high isocyanate concentrations lead to lower foam densities. The isocyanate concentration, based on the lactam used, is from 0.5 mol. percent to 20 mol. percent, preferably from 2.0 mol. percent to 12.0 mol. percent. The molar ratio of isocyanate to base is from 5:1 to 400:1, preferably from 20:1 to 200:1.

Although the density of the foams is generally from 0.05 to 0.9 g./cm.$^3$, it can be reduced even further by foaming under reduced pressure or by the addition of products which give off or form gases. Homopolymers of caprolactam usually produce hard foams. Relatively high molecular weight lactams, such as lauric lactam, or copolymers of lactams, for example, caprolactam and lauric lactam, produce softer and more elastic foams. The viscosity of the polymers in m-cresol (1 g. in 100 g. of solvent) is generally above 6. A large proportion of the polymers is crosslinked.

The foams can be produced by two methods, depending upon the purpose for which they are to be used. In one method, the prepared mixture of lactam, isocyanate or masked isocyanate and the alkali-metal or alkaline-earth metal borohydride, is heated with or without stirring to the foaming temperature. In the alternative method, a mixture of lactam and isocyanate and a mixture of lactam and alkali-metal or alkaline-earth metal borohydride are heated separately to the foaming temperature, and then combined. The first method is particularly suitable for the production of relatively small mouldings, whilst the second method is eminently suitable for the continuous production of foams.

Fillers such as powdered asbestos, talc, glass and asbestos fibres, as well as dyes and pigments may be added to the foams produced by the process according to the invention. Polyamide foams produced by this process may be used for electrical, thermal or acoustic insulation where mechanical stressing is also involved. For example, they can be used in the building industry to fill cavities providing the foam is introduced before it solidifies. In this case, it is of advantage to produce the foam in an extruder. Where foaming is carried out in moulds, it is possible to produce foams moulded into specific shapes which also withstand high mechanical stresses. Mouldings of this kind can be used for example in the building industry or for the production of thermally insulated containers. They can be sawn and machined with cutting tools in general. Screws and nails can be anchored in these foams. Elastic products are particularly suitable for the electrical insulation of wires.

The following examples are to illustrate more particularly the invention without limitation.

EXAMPLE 1

A mixture of 100 g. of caprolactam and 0.3 g. of sodium borohydride is heated at 210° C. After that temperature has been reached, 4 g. of hexamethylene diisocyanate are stirred in. Foaming begins immediately, resulting in the formation of a foam with a density of 0.15 g./cm.$^3$.

EXAMPLE 2

A mixture of 80 g. of caprolactam and 8 g. of hexamethylene diisocyanate is heated at 190° C. A mixture of 0.6 g. of sodium borohydride and 20 g. of caprolactam is stirred in. The reaction which begins immediately, produces a foam with a density of 0.08 g./cm.$^3$.

EXAMPLE 3

A mixture of 100 g. of caprolactam, 0.6 g. of sodium borohydride and 10 g. of hexamethylene-bis-carbamido caprolactam, is stirred in an oil bath preheated to 200° C. until foaming commences. The resulting foam has a density of 0.2 g./cm.$^3$.

EXAMPLE 4

A mixture of 20 g. of caprolactam and 0.05 g. of sodium borohydride is heated to 140° C. As soon as that temperature has been reached, 0.8 g. of hexamethylene diisocyanate are added with stirring. The resulting foam has a density of 0.47 g./cm.$^3$.

EXAMPLE 5

20 g. of caprolactam are heated to 200° C., after which 0.8 g. of 4,4'-diphenylmethane diisocyanate and 0.05 g. of sodium borohydride are added. A foam with a density of 0.3 g./cm.$^3$ is formed after about 1 minute.

EXAMPLE 6

20 g. of lauric lactam are heated to 200° C., after which 0.8 g. of hexamethylene diisocyanate are added and then 0.05 g. of sodium borohydride are stirred in. Foaming begins after an interval of approximately 1 minute. The density of the resulting foam is 0.37 g./cm.$^3$.

EXAMPLE 7

A mixture of 100 g. of caprolactam, 4 g. of hexamethylene diisocyanate, 0.3 g. of sodium borohydride and 40 g. of asbestos powder, is heated to 200° C. When foaming starts, the pressure is reduced to 10 mm. Hg. The resulting foam has a density of 0.09 g./cm.$^3$.

What we claim is:

1. A process for the production of polyamide foams from lactams which comprises polymerizing a lactam having at least seven ring members or mixtures thereof in the presence of a (1) polymerization accelerator selected from the group consisting of an organic isocyanate and a masked organic isocyanate; and (2) a metal borohydride selected from the group consisting of an alkali-metal borohydride and an alkaline-earth metal borohydride; the molar ratio of the (1) polymerization accelerator and (2) the metal borohydride being from 5:1 to 400:1; said polymerizing being effected at temperatures in the range from 100 to 260° C.

2. The process of claim 1, wherein said metal borohydride being used in quantities of 0.01 to 2 mol percent, based on the lactam.

3. The process of claim 1, wherein said metal borohydride is sodium borohydride.

4. The process of claim 1 wherein the polymerization is conducted in the presence of finely divided solids.

5. The process of claim 1, wherein said polymerization accelerator is hexamethylene diisocyanate.

6. The process of claim 1, wherein said polymerization accelerator is 4,4'-diphenylmethane diisocyanate.

7. The process of claim 1, wherein said polymerization accelerator is hexamethylene - 1,6 - bis-carbamidocaprolactam isocyanate.

8. The process of claim 4, wherein said finely divided solid is asbestos powder.

References Cited

UNITED STATES PATENTS

| | | | |
|---|---|---|---|
| 3,017,392 | 1/1962 | Butler et al. | 260—78L |
| 3,028,369 | 4/1962 | Butler et al. | 260—78L |
| 3,084,127 | 4/1963 | Vakousky | 260—899 |
| 3,372,137 | 3/1968 | Tierney | 260—78L |
| 3,382,195 | 5/1968 | Gilch et al. | 260—2.5N |

MURRAY TILLMAN, Primary Examiner

M. FOELAK, Assistant Examiner

U.S. Cl. X.R.

260—37, 78